United States Patent
Doherty, Jr.

[11] 3,856,259
[45] Dec. 24, 1974

[54] THERMALLY RESPONSIVE VALVE ASSEMBLY

[75] Inventor: John Doherty, Jr., Assonet, Mass.

[73] Assignee: Texas Instruments Incorporated, Dallas, Tex.

[22] Filed: Dec. 20, 1973

[21] Appl. No.: 426,768

[52] U.S. Cl. ................... 251/11, 251/75, 236/48 R
[51] Int. Cl. ......................... F03g 7/06, F16k 31/56
[58] Field of Search ......... 251/11, 75; 236/48 R, 81

[56] References Cited
UNITED STATES PATENTS

| | | | |
|---|---|---|---|
| 1,665,719 | 4/1928 | Schnepp | 236/48 R |
| 3,319,888 | 5/1967 | Creager | 236/81 |

*Primary Examiner*—Arnold Rosenthal
*Attorney, Agent, or Firm*—John A. Haug; James P. McAndrews

[57] ABSTRACT

A thermally responsive, electrically actuated valve assembly comprising a generally cylindrical capsule having an inlet port in one face thereof and an outlet port in its other face with communication between ports, with one of the ports having a valve seat. Valve means within the capsule are movable into and out of engagement with the valve seat, thereby selectively to block communication between ports, the valve means comprising a generally circular, dish-shaped snap-acting thermostatic disk responsive to a variation in temperature to abruptly change its curvature between a first position in which the disk is bowed toward the seat and the valve means are closed against the seat thereby to block communication between the ports and a second position in which the disk is bowed away from the seat and the valve means are spaced therefrom thereby to open communication between the ports. Spring means bias the disk and the valve means toward the seat when the disk is in its first position thereby to apply sufficient force thereto thereby to maintain the valve means closed against the seat. An electric heater is secured to one face of the capsule in heat-exchange relationship with the disk whereby when electrically energized, it will heat the disk to a temperature at which the disk will reverse curvature from one position to another. An abutment is provided within the capsule against which the disk reacts as it snaps over center from its first to its second position.

11 Claims, 5 Drawing Figures

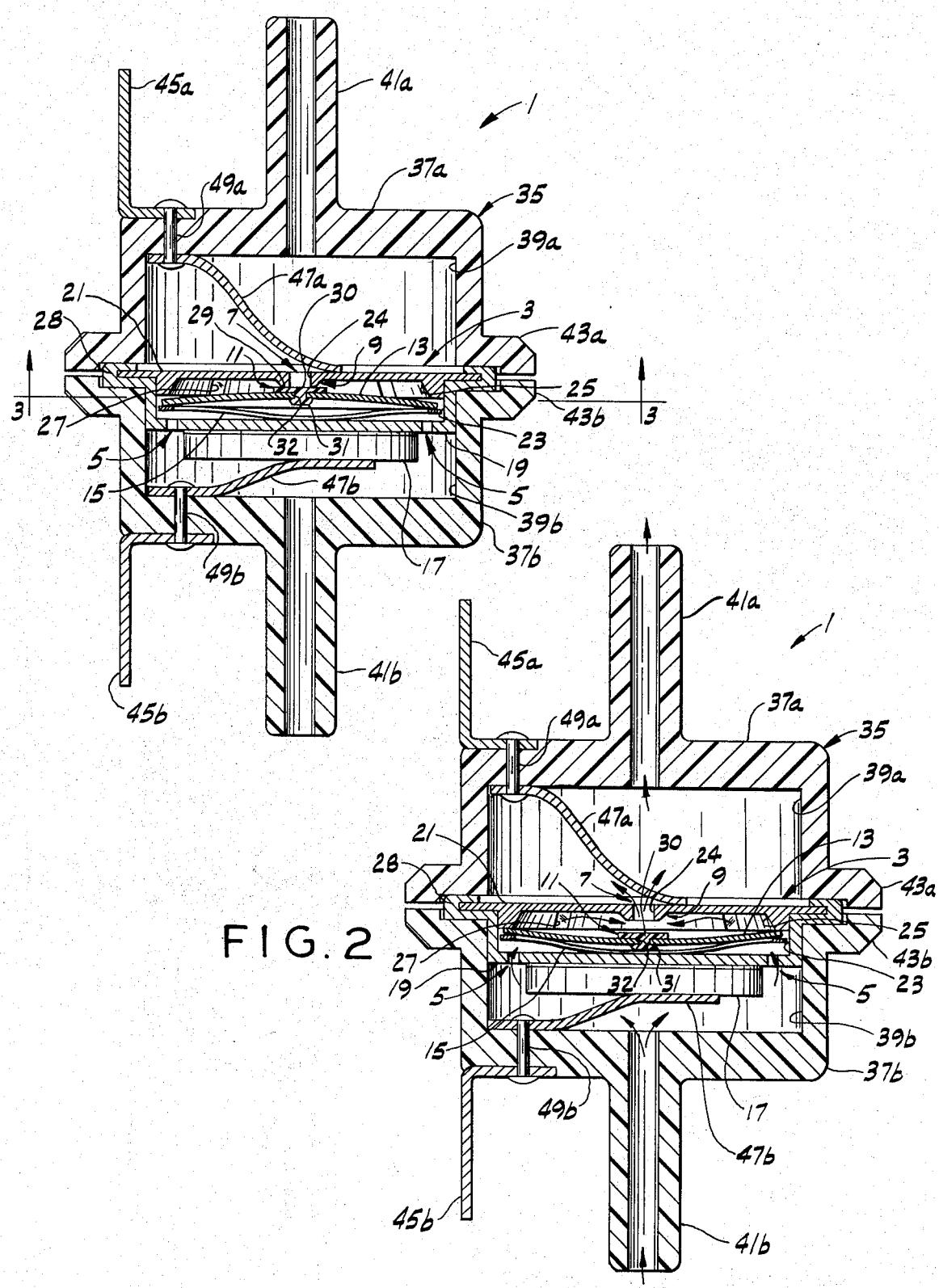

THERMALLY RESPONSIVE VALVE ASSEMBLY

BACKGROUND OF THE INVENTION

This invention relates to a valve assembly and more particularly to a relatively small electrically actuated valve assembly for blocking or opening communication between an inlet and an outlet.

More particularly, this invention relates to a valve assembly having a thermostatic disk adapted selectively to block or open communication through a valve assembly, the thermostatic disk being heated by means of an electric heater whereby the disk abruptly moves (i.e., snaps over center) from a first curvature position to a reversed curvature position either to block or to open communication through the valve assembly upon heating the thermostatic disk to a predetermined trip temperature or upon cooling below a predetermined reset temperature. Such valves have a wide variety of uses, for example, where a valve is to be deactuated from a remote position by an electrical input, or where time-delayed valve action is desired. In the latter instance, the time at which the relief valve opens or closes is delayed from the time the heater is either energized or deenergized, the time delay varying with ambient temperature conditions, the temperature differential of the disk, etc. Such valves are also useful where valve actuation in response to a cooling effect is desired. Another use for such valves is as a component for use in automotive air pollution control systems, e.g., as a time-delay vacuum actuator wherein the time delay is variable depending on ambient temperature conditions.

Reference may be made to U.S. Pat. No. 2,613,874 illustrating a thermally actuated relief valve having a bimetallic disk carrying an adjustable valve member movable into and out of engagement with a valve seat.

SUMMARY OF THE INVENTION

Among the several objects of this invention may be noted the provision of a thermally responsive valve assembly in which the principal valve components are incorporated in a compact capsule conveniently installable as a self-contained unit in various housings; the provision of such a valve assembly which may be actuated electrically from a remote position; the provision of such a valve assembly which may be utilized as a time-delay valve and in which the degree of delay may be a function of ambient temperature; the provision of such a valve assembly in which actuation may be in response to a cooling effect; and the provision of such a valve assembly which is economical to construct and which is reliable in operation. Other objects and features of this invention will be in part apparent and in part pointed out hereinafter.

Briefly, a thermally responsive electrically actuated valve assembly comprises a generally flat cylindrical capsule having an inlet port in one face and an outlet port in the other face thereof with communication between the ports, with one of the ports having a valve seat. Valve means are movable into and out of engagement with the valve seat thereby selectively to block communication between the ports. The valve means comprise a generally circular dish-shaped snap-acting thermostatic disk responsive to a variation in temperature to abruptly change its curvature between a first position in which the disk is bowed toward the seat and the valve means are closed against the seat thereby to block communication between the ports and a second position in which the disk is bowed away from the seat and the valve means are spaced therefrom thereby to open communication between the ports. Spring means bias the disk and the valve means toward the valve seat when the disk is in its first position thereby to apply sufficient force thereto to maintain the valve means closed against the seat. Abutment means are provided against which the disk may react as it snaps over center from its first to its second position. An electric heater is secured to one face of the capsule in heat-exchange relationship with the disk whereby when electrically energized it will heat the disk to a temperature at which the disk will reverse curvature from one position to the other.

BRIEF DESCRIPTION OF THE DRAWINGS

FIG. 1 is a longitudinal section of a valve assembly of this invention illustrating a thermostatic disk in a first position in engagement with a valve seat for blocking communication between the inlet and outlet of the valve assembly;

FIG. 2 is a view similar to FIG. 1 illustrating the thermostatic disk in a second position clear of the valve seat;

Corresponding reference characters indicate corresponding parts throughout the several views of the drawings.

DESCRIPTION OF THE PREFERRED EMBODIMENTS

Figure 4:
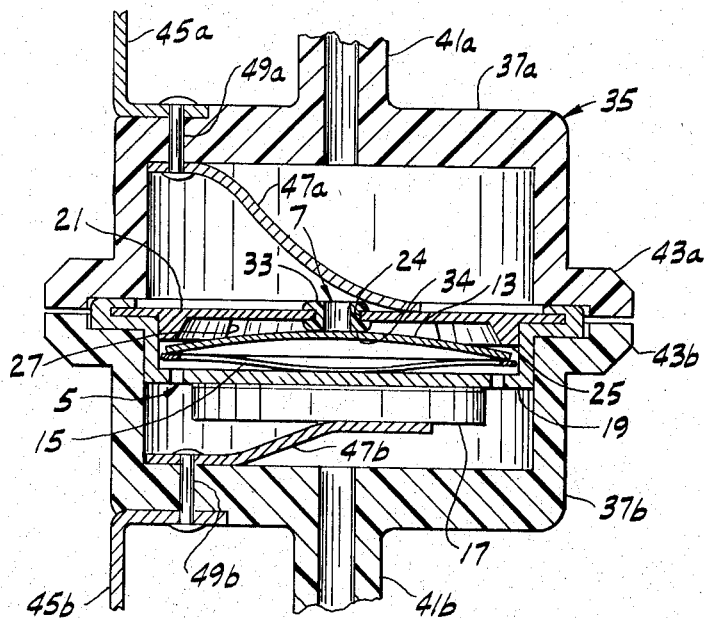
FIG. 4 is an enlarged partial cross section illustrating another embodiment of this invention.

Referring now to the drawings, a thermally responsive valve assembly of this invention, indicated in its entirety at 1, is shown to include a capsule, generally indicated at 3, preferably of an electrically and thermally conductive metal, having one or more inlet ports 5 in one face thereof (e.g., its lower face as viewed in FIGS. 1 and 2) and an outlet port 7 in the other face of the capsule with communication between the ports within the capsule (see the arrows in FIG. 2). Outlet port 7 has a valve seat 9 formed thereon. Valve means generally indicated at 11 are provided within the capsule and are movable into and out of engagement with the valve seat 9 thereby to selectively block communication between the inlet and outlet ports. It will be understood that that "inlet" and "outlet" for ports 5 and 7 are descriptive of the valve assembly shown and that fluid may be introduced into the valve assembly via port 7 and exit via port 5.

More specifically, valve means 11 is shown to comprise a generally circular, dish-shaped, snap-acting bimetal thermostatic disk 13 responsive to a variation in temperatures abruptly to change it curvature between a first or closed position (as shown in FIG. 1) in which the disk is bowed toward valve seat 9 and the disk is in engagement with the valve seat thereby to block communication between ports 5 and 7 and a second or open position (as shown in FIG. 2) in which the disk is bowed away from the valve seat thereby to permit the flow of fluid between ports 5 and 7. A spring or wave washer 15 is disposed in the capsule between one face thereof (e.g., the lower face) and the disk so as to bias the disk into engagement with valve seat 9 when the disk is in its closed position, thereby to apply sufficient force to the disk so as to maintain the disk closed against the valve seat.

Valve assembly 1 further includes electric heater 17, preferably a self-regulating heater, secured or bonded to the inlet face of capsule 3 in heat-exchange relation therewith whereby when the heater is electrically energized it will heat disk 13 to a predetermined snap-over temperature at which the disk will rapidly reverse its curvature from one position to the other. More particularly, heater 17 is a pill or disk of an electrical resistance material, preferably one formed from a steep-slope positive temperature coefficient (PTC) material such as certain doped barium titanates. The resistance of this material increases sharply above a threshold temperature within a relatively narrow temperature range. Reference may be made to U.S. Pat. No. 3,489,976 for a more detailed disclosure of PTC heaters.

Figure 3:
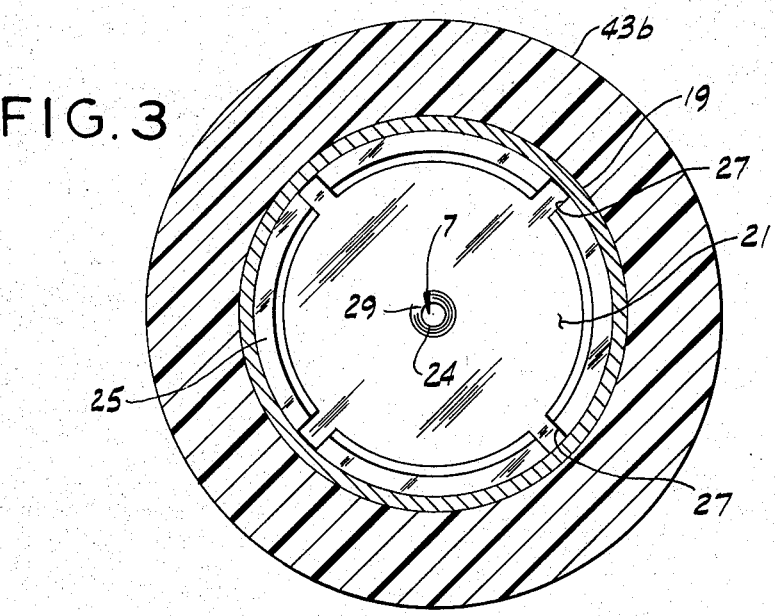
FIG. 3 is a horizontal section on line 3—3 of FIG. 1 with some parts omitted for clarity.

Capsule 3 is generally cylindrical in shape and has a first or cup-shaped portion 19 of brass or other suitable material and a cover 21. Portion 19 has a cylindric recess 23 therein adapted to receive disk 13 and wave spring washer 15 with inlet ports 5 located in the bottom of the recess. As shown in FIGS. 1–3, cover 21 has a hole 24 at its center constituting outlet port 7 and a peripheral rim constituted by shoulders 25 extending inwardly into recess 23 to serve as an abutment spaced from the peripheral edge of disk 13 when the disk is in its first or closed position (see FIG. 1) and against which the edges of the disk react as it snaps over center to effect movement of the disk into its second or open position. Disk 13 is of slightly smaller diameter than that of recess 23, and, as shown in FIG. 3, rim 25 is notched, as indicated at 27, to provide flow paths from ports 5 to 7 (see the arrows in FIG. 2). Cover 21 is generally flat and is sealingly secured to cup-shaped portion 19 as by folding over a portion of 19 around the outer margins of the cover so as to form a flange 28.

As shown in FIGS. 1 and 2, valve seat 9 is constituted by a circular ridge 29 surrounding hole 24 on the underside of cover 21 and valve means 11 includes a resilient flexible circular pad 30 of a suitable somewhat resilient material, such as a synthetic rubber, secured to the surface of disk 11 adjacent outlet port 9. This pad is held in place on disk 11 by means of a button 31 insertable through a hole 32 in disk 11. This button is integral with pad 30 and initially may have an elongate tab (not shown) which is readily insertable through hole 32 and which may be stretched so as to pull button 31 through the hole. After the button has been inserted through hole 32, the button may then be cut from the pad.

An alternative arrangement for the valve means 11 is shown in FIG. 4 in which a grommet 33 of resilient elastic material (e.g., a suitable synthetic or natural elastomer) is inserted into opening 24 in cover 21. A face 34 of this grommet serves as the valve seat. Disk 13A is engageable with grommet face 34 when the cover is in its first or closed position thereby to block communication through the capsule.

Capsule 3 is conveniently mounted within or received in any of various housings such as that generally indicated at 35 for connection in a fluid system. More particularly, housing 35 includes two identical housing portions or halves 37a,37b, preferably made of suitable insulative material (e.g., synthetic resin). Each housing portion 37a,37b has a respective recess 39a,39b therein for reception of a portion of capsule 3, a nipple 41a,41b for connection either to a fluid source or to other components in a fluid system. Each housing portion also has an external flange 43a,43b, respectively, adapted to sealingly engage flange 28 of capsule 3. Thus, fluid (e.g., air) may only flow from the recess in one housing portion to the recess in the other housing portion through ports 5 and 7 of capsule 3. Each housing portion also has an electrical terminal 45a,45b, respectively, connected thereto by means of a respective rivet at 49a,49b, with the contact arm 47b disposed in recess 39b adapted to engage heater 17 and with the contact arm 47a disposed in recess 39a adapted to engage cover 23, thereby to complete an electrical circuit for energization of heater 17. With housing portions 37a,37b assembled and with the capsule received in recesses 39a,39b, cup-shaped capsule portion 19 is positioned in recess 39b, this recess constituting an inlet passage in communication with inlet ports 5, and cover 23 is received within recess 39a, this recess constituting an outlet passage in communication with outlet port 7. Of course, capsule 3 may be mounted in the identical housing portions in an inverted position.

Disk 13 is a bimetal thermostatic disk adapted abruptly to snap over center from its curvature position 23 shown in FIG. 2 to its opposite curvature as shown in FIG. 1 when it is heated to a predetermined elevated temperature (i.e., its trip temperature). Disk 13 has two metallic layers bonded together in back-to-back relation with one of the layers having a higher thermal coefficient of expansion than the other. As shown in FIG. 1, disk 13 may have its high-expansion side disposed away from valve seat 9 so that, with the disk at room temperature, the valve assembly is normally closed and upon energization of heater 17 to heat the disk to its trip temperature, the disk snaps over center to open the valve assembly. The disk will remain open so long as the disk remains above its reset temperature (i.e., a temperature at which the disk will return to its closed position). Alternately, disk 13 may have its high-expansion side disposed toward valve seat 9 so that, with the disk below its trip temperature, the valve assembly will be normally open and, upon energization of heater 17, disk 13 will snap over center to block communication between ports 5 and 7.

As mentioned above, heater 17 is preferably a self-regulating PTC heater which has a first or low-resistance high-heat-generating state below a certain temperature and a second or high-resistance low-heat-generating state at temperatures above the above-stated temperature. Thus, upon energization of PTC heater 17, its temperature will rapidly increase while in its first heat-generating state, thus effecting rapid heating of disk 13 to its trip temperature. Upon the heater attaining its transition temperature, its resistance will increase to the point where relatively low heat is generated by the heater. Thus, the heater will stabilize at a steady-state condition. The trip temperature of the disk is such that the disk is heated to its snap-over temperature while the heater is in its high-heat-generating state and, after the disk snaps over center, the heater will enter its low-heat-generating state so as to maintain the temperature of the disk above its reset temperature.

Thus, valve assembly 1 may function as a time-delay valve in which there is a time-delay interval between energization (or deenergization) of heater 17 and actuation of disk 13 to open or to block communication between ports 5 and 7. The actual time-delay interval of valve assembly 1 is dependent on a variety of functions and conditions including the heating characteristics of heater 17, the current and voltage supplied to the heater, ambient temperature conditions, heat transfer from the heater to disk 13, and the heating or cooling effect of fluid flowing through capsule 3.

For a valve assembly 1 having a disk 13 which at room temperature is in its second position clear of valve seat 9 (as shown in FIG. 2), and which is adapted to abruptly snap over center at a predetermined elevated trip temperature, a first delay exists between the instant heater 17 is energized and the instant disk 13 attains its trip temperature. A second time delay also exists between the time heater 17 is deenergized and the time disk 13 cools below its reset temperature, with either of the above-mentioned time-delay periods being responsive to ambient temperature conditions.

Figure 5:
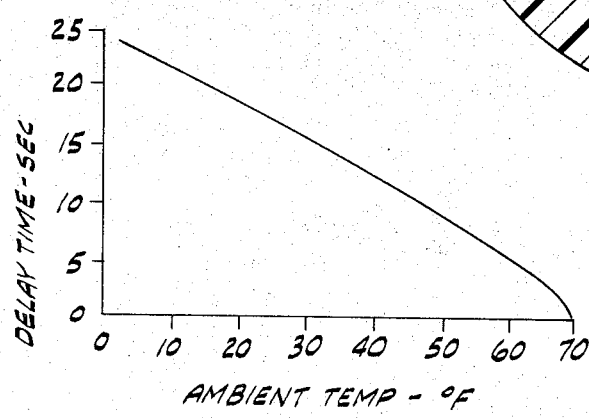
FIG. 5 is a plot of time-delay operation of the valve assembly as a function of ambient temperature.

For example, in a valve assembly 1 adapted to heat its disk to its trip temperature so as to block outlet port 7 and having given heater characteristics and constant voltage applied to the heater, the time required to heat the disk to its trip temperature may vary with ambient temperature according to the curve shown in FIG. 5. It will be noted that with ambient temperature at 70°F., the disk attains its trip temperature almost instantaneously while at 0°F. it may take approximately 25 seconds to heat the disk to its trip temperature. It will be understood that a valve assembly 1 of this invention may be operated in delayed response to deenergization of heater 17, whereby with the disk at a predetermined stabilized temperature, the disk will cool to its reset temperature in a time dependent on ambient temperature conditions. Also, disk 13 may be maintained at a temperature slightly above its reset temperature in its open position (see FIG. 2), whereupon an increase in air flow through the valve assembly causes cooling of the disk below its reset temperature and thus causes the valve to close. Thus, the valve assembly of this invention will serve to sense and respond to a cooling effect or change in ambient temperature. Further, this valve assembly is particularly useful for actuation electrically from a remote position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A thermally responsive electrically actuated valve assembly comprising a generally flat cylindrical capsule having an inlet port in one face and an outlet port in the other face thereof with communication between said ports, one of said ports having a valve seat, valve means movable into and out of engagement with said valve seat thereby selectively to block communication between said ports, said valve means comprising a generally circular dish-shaped snap-acting thermostatic disk responsive to a variation in temperature to abruptly change its curvature between a first position in which said disk is bowed toward said seat and the valve means are closed against said seat thereby to block communication between the ports and a second position in which the disk is bowed away from the seat and the valve means are spaced therefrom thereby to open communication between the ports, spring means biasing said disk and said valve means toward said seat when the disk is in said first position thereby to apply sufficient force thereto to maintain said valve means closed against said seat, an electric heater secured to one face of the capsule in heat exchange relationship with said disk whereby when electrically energized it will heat said disk to a temperature at which said disk will reverse curvature from one position to the other, and abutment means spaced from the disk when it is in its first position and against which the disk reacts to effect movement thereof into its second position.

2. A valve assembly as set forth in claim 1 further comprising a housing adapted for reception of said capsule and comprising a first portion having a passage therein constituting an inlet passage in communication with said inlet port and a second housing portion having a passage therein constituting an outlet passage in communication with said outlet port, said valve means selectively blocking communication between said inlet and said outlet passages in said housing.

3. A valve assembly as set forth in claim 2 wherein said first housing portion includes a nipple for connection of said inlet passage to a fluid source.

4. A valve assembly as set forth in claim 3 wherein said second housing portion includes a nipple for connection of said outlet passage to other components in a fluid system.

5. A valve assembly as set forth in claim 1 wherein said thermostatic disk changes from its first position to its second position at a first temperature and said heater is a PTC material having a first low resistance, high heat generating state below a second temperature higher than said first temperature to cause actuation of said thermostatic disk, and a second high resistance, low heat generating state at temperatures above the second temperature to maintain the thermostatic disk in its first position.

6. A valve assembly as set forth in claim 5 further comprising a housing adapted for reception of said capsule and comprising a first housing portion having a passage therein constituting an inlet passage in communication with said inlet port and a second housing portion having a passage therein constituting an outlet passage in communication with said outlet port, said housing having a first and a second electrical terminal secured thereto, said terminals being electrically connected to said heater.

7. A valve assembly as set forth in claim 6 wherein said housing portions are identical.

8. A valve assembly as set forth in claim 6 wherein said capsule is of an electrically conductive material and said heater is in electrical contact with said capsule, one of said terminals being in contact with said capsule and the other of said terminals being in contact with said heater.

9. A valve assembly as set forth in claim 8 wherein said other terminal includes a contact arm disposed within said housing in resilient engagement with said heater.

10. A valve assembly as set forth in claim 5 wherein said thermostatic disk is of bimetal having its high expansion side disposed away from said outlet port, whereby upon energization of said heater and upon heating of said disk it abruptly changes its curvature from its second to its first position to block communication between said ports in delayed response to energization of said heater.

11. A valve assembly as set forth in claim 5 wherein said thermostatic disk is of bimetal having its high expansion side disposed toward said outlet port, whereby upon energization of said heater and upon heating of said disk said disk abruptly moves from its first to its second position thereby to open communication between said ports and upon deenergization of said heater and upon cooling of the disk, said disk moving from its second to its first position thereby to block communication between said ports in delayed response to deenergization of said heater.

* * * * *